(12) United States Patent
Ladvánszky et al.

(10) Patent No.: US 11,146,441 B2
(45) Date of Patent: Oct. 12, 2021

(54) TECHNIQUE FOR COHERENT DATA COMMUNICATION

(71) Applicant: Telefonaktiebolaget LM Ericsson (publ), Stockholm (SE)

(72) Inventors: János Ladvánszky, Pomaz (HU); Benedek Kovács, Budapest (HU)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/768,190

(22) PCT Filed: Dec. 1, 2017

(86) PCT No.: PCT/EP2017/081146
§ 371 (c)(1),
(2) Date: May 29, 2020

(87) PCT Pub. No.: WO2019/105568
PCT Pub. Date: Jun. 6, 2019

(65) Prior Publication Data
US 2020/0304360 A1 Sep. 24, 2020

(51) Int. Cl.
| H04L 27/34 | (2006.01) |
| H04B 10/54 | (2013.01) |
| H04B 10/548 | (2013.01) |
| H04B 10/61 | (2013.01) |
| H04L 1/00 | (2006.01) |

(52) U.S. Cl.
CPC ....... *H04L 27/3405* (2013.01); *H04B 10/541* (2013.01); *H04B 10/548* (2013.01); *H04B 10/612* (2013.01); *H04L 1/0003* (2013.01)

(58) Field of Classification Search
CPC ... H04L 27/3405; H04L 1/0003; H04L 27/34; H04B 10/541; H04B 10/548; H04B 10/612
USPC .......................... 375/260; 455/434; 370/328
See application file for complete search history.

(56) References Cited

U.S. PATENT DOCUMENTS

| 9,705,592 B1 | 7/2017 | Schmogrow et al. |
| 2001/0015999 A1 | 8/2001 | Nam |
| 2011/0199968 A1* | 8/2011 | Kim ..................... H04B 7/0626 370/328 |

(Continued)

OTHER PUBLICATIONS

Proakis, John G., "Digital Communications through Fading Multipath Channels", Digital Communications, McGrawHill, 4th Edition, NY, 2001, pp. 1-938.

(Continued)

*Primary Examiner* — Fitwi Y Hailegiorgis
(74) *Attorney, Agent, or Firm* — Murphy, Bilak & Homiller, PLLC

(57) ABSTRACT

A technique for transmitting data is described. The data is represented by a modulation symbol comprising an in-phase component and a quadrature component. Considering a method aspect of the technique, the modulation symbol (510) is split into at least two different baseband signals (522, 524), which are in phase with each other and jointly representative of the modulation symbol (510). The at least two baseband signals (522, 524) are up-converted from a baseband frequency to a transmission frequency. Each of the at least two up-converted signals (532, 534) is transmitted on a different physical channel (536, 538).

20 Claims, 15 Drawing Sheets

(56) References Cited

U.S. PATENT DOCUMENTS

2013/0237218 A1* 9/2013 Li .................. H04W 48/16
455/434
2018/0123849 A1* 5/2018 Si .................. H04J 11/0073

OTHER PUBLICATIONS

Joo, Jeong-Min, et al., "20-Gb/s Adaptively Modulated Optical OFDM Transmission over 20-km Single Fiber Loopback WDM PON based on Separated I/Q Baseband Delivery using 1 GHz RSOAs", OFC/NFOEC Technical Digest, 2012, pp. 1-3.

Jung, Sun-Young, "I/Q Channel Separated Baseband OFDM Optical Transmission Using Orthogonal Polarizations in IM/DD System", Journal of Lightwave Technology, vol. 32, No. 13, Jul. 1, 2014, pp. 2392-2398.

Jung, Sun-Young, et al., "Optical Transmission of Baseband OFDM in IM/DD System by PDM based I/Q channel separation", IEEE, The 12th International Conference on Optical Internet Proceedings, 2014, pp. 1-2.

"AWR Analyst; Full 3D finite element method EM analysis software", Cadence Datasheet; www.cadence.com/go/awr, May 7, 2020, pp. 1-4.

"AWR Axiem; 3D planar EM analysis software", Cadence Datasheet; www.cadence.com/go/awr, May 7, 2020, pp. 1-4.

"AWR Design Environment; RF/microwave EDA software suite", Cadence Datasheet; www.cadence.com/go/awr, May 1, 2020, pp. 1-4.

"AWR Microwave Office; RF and microwave circuit design software", Cadence Datasheet; www.cadence.com/go/awr, May 7, 2020, pp. 1-4.

"AWR Visual System Simulator; Communications and radar systems design software", Cadence Datasheet; www.cadence.com/go/awr, May 7, 2020, pp. 1-4.

* cited by examiner

TECHNIQUE FOR COHERENT DATA COMMUNICATION

TECHNICAL FIELD

The present disclosure generally relates to a technique for transmitting or receiving data. More specifically and without limitation, the present disclosure relates to a technique for transmitting or receiving, over an incoherent channel, data represented by modulation symbols for a coherent channel. Furthermore, methods and devices for transmitting and receiving data that is represented by modulation symbols for a coherent channel are provided.

BACKGROUND

A low bit error rate (BER) or symbol error rate (SER) is important in the communication by digital modulation. For example, in time-critical communication such as ultra-reliability low-latency (URLL) communications, there is no time for requesting and performing retransmissions. The bit error rate (BER) is dependent on the signal-to-noise ratio (SNR). The BER as a function of the SNR is an important characteristic of a specific kind of digital modulation, which is also referred to as modulation scheme, keying or constellation.

Different constellations of the digital modulation provide different spectral efficiencies and further achieve different BERs for the same SNR. Usually the constellation is selected to achieve a trade-off between the lowest possible BER and the highest possible spectral efficiency. A plurality of constellations for digital modulations are known and described by John G. Proakis in "Digital Communications", Fourth Edition, McGraw-Hill, which book also describes techniques for calculating the BER. Moreover, the BER can be accurately simulated using existing tools such as Applied Wave Research (AWR) by National Instruments (NI). For a given constellation, the BER can only be improved by increasing the SNR.

However, in some situations increasing the BER is more important than increasing spectral efficiency. For example, in some situations increasing the BER by increasing the SNR may be not feasible or may even be impossible.

Moreover, transmitting symbols according to a digital modulation requires a coherent channel, i.e., transmitter and receiver have to be synchronized for both carrier frequency and phase. This level of synchronization is conventionally achieved at the receiver by means of a Costas loop, which is a circuit combining phase-locked loops (PLL) for each of in-phase and quadrature components. In contrast, synchronizing the receiver to the transmitter based on a single PLL provides a channel with significant phase noise. Such a channel is also referred to as an incoherent channel.

A separation of in-phase and quadrature components using orthogonal polarization is described by Sun-Young Jung et al. in "I/Q Channel Separated Baseband OFDM Optical Transmission Using Orthogonal Polarizations in IM/DD System", Journal of Lightwave Technology, Volume 32, Issue 13 as well as by Jeong-Min Joo et al. in "20-Gb/s adaptively modulated optical OFDM transmission over 20-km single fiber loopback WDM PON based on separated I/Q baseband delivery using 1 GHz RSOAs", Optical Fiber Communication Conference and Exposition (OFC/NFOEC). However, when using orthogonal polarization, the SNR is not optimal because noise is not polarized, thus the in-phase and quadrature components suffer fully correlated noise.

Furthermore, implementing a Costas loop is too complex and too power consuming for some categories of devices, which may act as the receiver or the transmitter. Such device categories may include narrowband Internet-of-Things devices (NB-IoT devices). Alternatively or in addition, a seamless coherent channel may not be available to some devices, which may include base stations serially connected by means of coherent microwave links and incoherent optical links.

SUMMARY

Accordingly, there is a need for a technique that allows improving the BER on a given channel or link. Particularly, there is a need for a technique that allows improving the BER independently of an increase in the SNR. Alternatively or in addition, there is a need for a technique that enables a coherently modulated communication over a link, a portion of which link includes an incoherent channel. Particularly, there is a need for a technique that allows communicating over an incoherent channel by modulation symbols that are defined for a coherent channel.

As to one aspect, a method of transmitting data that is represented or representable by a modulation symbol comprising an in-phase component and a quadrature component is provided. The method comprises or triggers a step of splitting the modulation symbol into at least two different baseband signals, which are in phase with each other and jointly representative of the modulation symbol. The method further comprises or triggers a step of up-converting the at least two baseband signals from a baseband frequency to a transmission frequency. The method further comprises or triggers a step of transmitting or initiating to transmit each of the at least two up-converted signals on a different physical channel.

The number of the physical channels may correspond to the number of the at least two different baseband signals. The at least two different baseband signals may be uniquely (i.e., injectively) assigned or mapped to the physical channels.

The at least two up-converted signals may also be referred to as transmission signals.

At least in some embodiments, by splitting the phase-sensitive modulation symbol into baseband signals and corresponding up-converted signals that are phase-robust, the BER can be reduced on a given channel or link, e.g., independently of an increase in the SNR. In same or further embodiments, the modulation symbol may be part of a coherently modulated communication over a link, a portion of which link includes the physical channels as an incoherent channels. The technique may allow communicating the modulation symbol that is defined for a coherent channel by transmitting the up-converted signals over the incoherent channels.

The technique provides another way to efficiently improve BER for a given constellation and/or link. The method may be applied to any constellation. As an example, the technique may be applied to improve BER of 4-QAM symbols. System simulation shows that an improvement by a factor of 40 can be achieved for a SNR=10 dB at least for some embodiments.

The method may be implemented for optical communications. Particularly, an amount of used bandwidth may be not critical or limiting for optical communications as compared to lower frequency communications such as a microwave link.

The technique may be applied for any digital modulation. The modulation symbol may be defined according to a QAM, e.g. $2^{2n}$-QAM, particularly 4-QAM or 16-QAM. The modulation symbol may be a 4-QAM or a 16-QAM symbol.

In any digital modulation, the splitting may be performed without expressly demodulating the modulation symbol into the data. The modulation symbol may be processed directly, e.g., by one or more projection for each in-phase component and quadrature component.

For more than 2 bits of data, e.g., for a 16-QAM symbol as the modulation symbol, the splitting may be performed at the bit-level. For example, the splitting may be performed by demodulating the modulation symbol into bits representing the data, and generating the baseband signals from the bits. Alternatively or in combination, the splitting may be performed by projecting the modulation symbol on in-phase and quadrature components (first projection), and decomposing each of the components (also referred to as a second projection) into subcomponents, from which the baseband signals are generated.

The BER may be reduced as a result of increasing a bandwidth occupied on the physical channels. By way of example, for a SNR=10 dB, the BER may be reduced by a factor of 20 by splitting the 16-QAM symbol according to the technique as compared to directly transmitting the 16-QAM symbol.

The technique may be implemented as a method of improving BER for a given modulation scheme and/or coding scheme. Alternatively or in addition, the technique may be implemented as method of selectively improving BER at the expense of the increased occupied bandwidth.

The at least two up-converted signals may be at least one of up-converted and transmitted in phase with each other.

One or more of the at least two different baseband signals may be representative of the in-phase component of the modulation symbol. A sum of one half of the at least two baseband signals may be representative of the in-phase component of the modulation symbol.

One or more of the at least two different baseband signals may be representative of the quadrature component of the modulation symbol. A sum of another half of the at least two baseband signals may be representative of the quadrature component of the modulation symbol.

Each of the baseband signals and/or the up-converted signals may be modulated by binary phase shift keying.

At least the step of splitting or the method may be selectively performed depending on a channel quality. Alternatively or in addition, the number of the baseband signals or the number of the physical channels may depend on a channel quality. The channel quality may relate to at least one of or each of the physical channels and/or a quality of a radio link (e.g., a microwave link) on which the modulation symbol is received.

The data may be transmitted to a data receiver. The data receiver may also be referred to as a device for receiving the data that is represented or representable by the modulation symbol or as a receiving station. A report indicative of the channel quality may be received from the data receiver. At least one or each of the different physical channels may be used for a time-division duplex (TDD) communication with the data receiver. Alternatively or in addition, the modulation symbol may be received from a symbol transmitter. A report indicative of the channel quality may be received from and/or transmitted to the symbol transmitter.

The method may be performed by a media converter arranged or arrangeable (e.g., in terms of communication) between the data receiver and the symbol transmitter. The media converter may also be referred to as media gateway.

The modulation symbol may be received on a microwave link from the symbol transmitter. Alternatively or in combination, the different physical channels may comprise at least one optical link.

The at least two transmission signals may be optically transmitted. The up-converting step may include modulating light for the optical transmission according to the baseband signals. The at least two baseband signals may be up-converted to and transmitted on a (e.g., continuous) wave of light by means of an optical modulator.

The at least two physical channels may include at least two separate optical fibers. Alternatively or in addition, the baseband signals may modulate the light at different subcarrier frequencies. For example, baseband signals may be mapped to different subcarrier frequencies. The baseband signals may be combined and applied for the light modulation. The different physical channels may comprise different subcarriers of an optical spectrum used for the transmission.

The modulation symbols may be split in the baseband prior to the up-converting. The baseband frequency may be on the order of kHz or a radio frequency. The transmission frequency may be an optical frequency.

The splitting of the modulation symbol may include at least one projection for each of the in-phase component and the quadrature component. Alternatively or in addition, the splitting may include demodulating the modulation symbol into the data and/or modulating the data into the at least two different baseband signals.

The splitting step may include splitting the data into bits representing the data. Each of the bits may be mapped to a different one of the at least two baseband signals. The mapping and/or the modulating of the data may be performed by retrieving an entry from at least one table depending on the data.

The data may comprise 2·n bits. The modulation symbol may be split into n in-phase components and n quadrature components. These 2·n components may define 2·n baseband signals for the up-conversion and the transmission on a respective different one of 2·n physical channels.

Noise on the at least two physical channels may be uncorrelated. For example, the different physical channels are not different radio channels that differ (e.g., only) in polarization or that differ (e.g., only) in a precoding (e.g., for different beams MIMO channel) on the same radio frequency. Alternatively or in addition, the different physical channels may for example not differ (e.g., only) in different modes of the same optical fiber.

The modulation symbol may be a quadrature modulation symbol, QAM.

Each of the baseband signals or each subcombination of the baseband signals may be not representative of the modulation symbol.

As to another aspect, a method of receiving data that is represented or representable by a modulation symbol comprising an in-phase component and a quadrature component is provided. The method comprises or triggers a step of receiving or initiating to receive each of at least two different transmission signals on a different physical channel, the transmission signals being in phase with each other and jointly representative of the modulation symbol. The method further comprises or triggers a step of down-converting the at least two transmission signals from a transmission frequency to a baseband frequency. The method further comprises or triggers a step of combining the at least two down-converted signals into the modulation symbol.

The at least two down-converted signals may also be referred to as baseband signals.

The other aspect may further comprise any feature or step, or may comprise a corresponding feature or step, which is disclosed in the context of the one aspect.

In any aspect, the physical channels may be part of a backhaul link in a radio access network (RAN). At least one aspect of the technique may be implemented at the RAN. Any one of the method aspects may be performed by a base station or a cell of the RAN. The base station may encompass any station that is configured to provide radio access to one or more radio devices. The radio device or each of the radio devices may be a user equipment (UE).

Alternatively or in addition, at least one aspect of the technique may be implemented at the radio device. The radio device may be configured for peer-to-peer communication (e.g., on a sidelink) and/or for accessing the RAN (e.g. an UL and/or downlink, DL). The radio device may be a user equipment (UE, e.g., a 3GPP UE), a mobile or portable station (STA, e.g. a Wi-Fi STA), a device for machine-type communication (MTC) or a combination thereof. Examples for the UE and the mobile station include a mobile phone and a tablet computer. Examples for the portable station include a laptop computer and a television set. Examples for the MTC device include robots, sensors and/or actuators, e.g., in manufacturing, automotive communication and home automation. The MTC device may be implemented in household appliances and consumer electronics. Examples for the combination include a self-driving vehicle, a door intercommunication system and an automated teller machine.

Examples for the base station may include a 3G base station or Node B, 4G base station or eNodeB, a 5G base station or gNodeB, an access point (e.g., a Wi-Fi access point) and a network controller (e.g., according to Bluetooth, ZigBee or Z-Wave).

The RAN may be implemented according to the Global System for Mobile Communications (GSM), the Universal Mobile Telecommunications System (UMTS), Long Term Evolution (LTE) and/or New Radio (NR).

The technique may be implemented on a Physical Layer (PHY), a Medium Access Control (MAC) layer, a Radio Link Control (RLC) layer and/or a Radio Resource Control (RRC) layer of a protocol stack for the radio communication.

As to a further aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., via the RAN and/or via the Internet and/or by the base station. Alternatively or in addition, the method may be encoded in a Field-Programmable Gate Array (FPGA) and/or an Application-Specific Integrated Circuit (ASIC), or the functionality may be provided for download by means of a hardware description language.

As to one device aspect, a device for transmitting data that is represented or representable by a modulation symbol comprising an in-phase component and a quadrature component is provided. The device is configured to perform the one method aspect. Alternatively or in addition, the device may comprise a splitting unit configured to split the modulation symbol into at least two different baseband signals, which are in phase with each other and jointly representative of the modulation symbol. The device may further comprise an up-converting unit configured to up-convert the at least two baseband signals from a baseband frequency to a transmission frequency. The device may further comprise a transmitting unit configured to transmit or initiate to transmit each of the at least two up-converted signals on a different physical channel.

As to another device aspect, a device for receiving data that is represented or representable by a modulation symbol comprising an in-phase component and a quadrature component is provided. The device is configured to perform the other method aspect. Alternatively or in addition, the device may comprise a receiving unit configured to receive or initiate to receive each of at least two different transmission signals on a different physical channel, the transmission signals being in phase with each other and jointly representative of the modulation symbol. The device may further comprise a down-converting unit configured to down-convert the at least two transmission signals from a transmission frequency to a baseband frequency. The device may further comprise a combining unit configured to combine the at least two down-converted signals into the modulation symbol.

As to a still further aspect, a device for transmitting data that is represented or representable by a modulation symbol comprising an in-phase component and a quadrature component is provided. The device comprises at least one processor and a memory. Said memory comprises instructions executable by said at least one processor whereby the device is operative to perform the one method aspect.

As to a still further aspect, a device for receiving data that is represented or representable by a modulation symbol comprising an in-phase component and a quadrature component is provided. The device comprises at least one processor and a memory. Said memory comprises instructions executable by said at least one processor whereby the device is operative to perform the other method aspect.

Any of the devices or any node or station for embodying the technique may further include any feature disclosed in the context of the method aspect. Particularly, any one of the units and modules, or a dedicated unit or module, may be configured to perform or trigger one or more of the steps of any one of the method aspect.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a 5G New Radio (NR) implementation, it is readily apparent that the technique described herein may also be implemented in any other radio network, including 3GPP LTE or a successor thereof, Wireless Local Area Network (WLAN) according to the standard family IEEE 802.11, Bluetooth according to the Bluetooth Special Interest Group (SIG), particularly Bluetooth Low Energy and Bluetooth broadcasting, and/or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
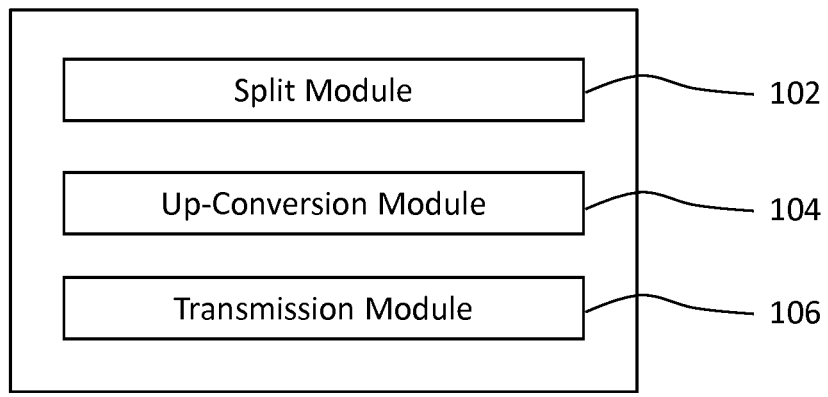
FIG. 1 shows a schematic block diagram of a device for transmitting data that is represented or representable by a modulation symbol comprising an in-phase component and a quadrature component.

FIG. 1 schematically illustrates a block diagram of a device for transmitting data that is represented or representable by a modulation symbol comprising an in-phase component and a quadrature component. The device is generically referred to by reference sign 100.

The device 100 comprises a split module 102 that splits the modulation symbol into at least two different baseband signals, which are in phase with each other and jointly representative of the modulation symbol. The device 100 further comprises an up-conversion module 104 that up-converts the at least two baseband signals from a baseband frequency to a transmission frequency. A transmission module 106 transmits or initiates transmitting each of the at least two up-converted signals on a different physical channel.

Any of the modules of the device 100 may be implemented by units configured to provide the corresponding functionality.

Figure 2:
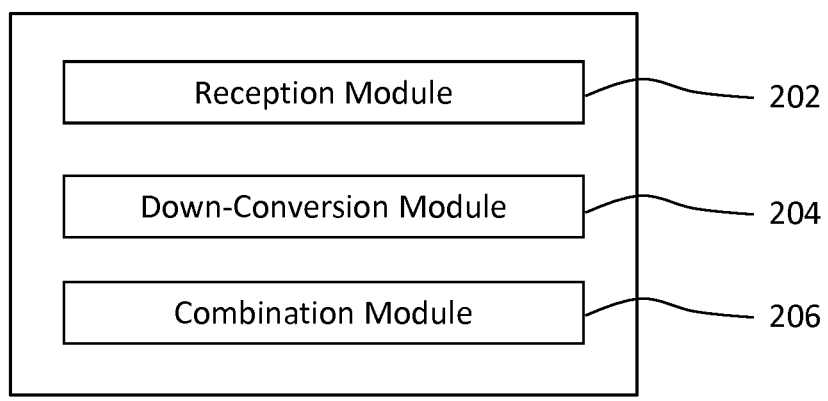
FIG. 2 shows a flowchart for a method of transmitting data that is represented or representable by a modulation symbol comprising an in-phase component and a quadrature component, which method is implementable by the device of FIG. 1.

FIG. 2 schematically illustrates a block diagram of a device for receiving data that is represented or representable by a modulation symbol comprising an in-phase component and a quadrature component. The device is generically referred to by reference sign 200.

The device 200 comprises a reception module 202 that receives or initiates to receive each of at least two different transmission signals on a different physical channel. The transmission signals are in phase with each other. The transmission signals are jointly representative of the modulation symbol. A down-conversion module 204 of the device 200 converts the at least two transmission signals from a transmission frequency down to a baseband frequency. The at least two down-converted signals are combined into the modulation symbol by a combination module 206 of the device 200.

At least one of the device 100 and the device 200 may be connected to and/or part of a radio access network (RAN). The device 100 and/or the device 200 may be embodied by or at a base station of the RAN, nodes connected to the RAN for controlling the base station or a combination thereof. Alternatively or in combination, at least one of the device 100 and the device 200 may be embodied by or at a radio device wirelessly connected or connectable to the RAN (particularly to the base station), a terminal connected to the radio device for controlling the radio device or a combination thereof.

The base station may encompass a network controller (e.g., a Wi-Fi access point) or a radio access node (e.g., a 3G Node B, a 4G eNodeB or a 5G gNodeB) of the RAN. The base station may be configured to provide radio access to one or more radio devices. Alternatively or in addition, the one or more radio devices may include a mobile or portable station or a radio device connectable to the RAN. Each radio device may be a user equipment (UE) and/or a device for machine-type communication (MTC). Two or more radio devices may be configured to wirelessly connect to each other, e.g., in an ad-hoc radio network or via 3GPP sidelinks.

Figure 3:
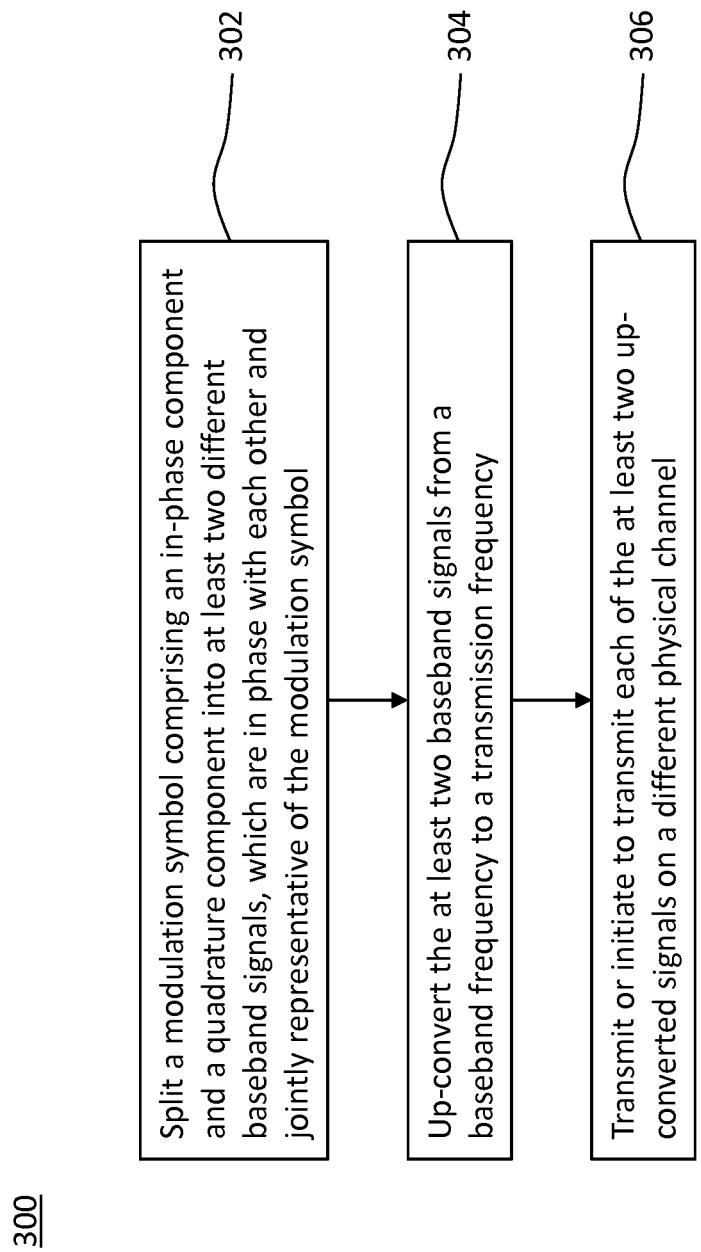
FIG. 3 shows a schematic block diagram of a device for receiving data that is represented or representable by a modulation symbol comprising an in-phase component and a quadrature component.

FIG. 3 shows a flowchart for a method 300 of transmitting data that is represented or representable by a modulation symbol comprising an in-phase component and a quadrature component.

The method 300 comprises a step 302 of splitting the modulation symbol into at least two different baseband signals. The at least two different baseband signals are in phase with each other and jointly representative of the modulation symbol. The at least two baseband signals are up-converted from a baseband frequency to a transmission frequency in a step 304 of the method 300. Each of the at least two up-converted signals is transmitted on a different physical channel according to a step 306 of the method 300.

The method 300 may be performed by the device 100, e.g., at or using the base station of the RAN. For example, the modules 102, 104 and 106 may perform the steps 202, 204 and 206, respectively.

Figure 4:
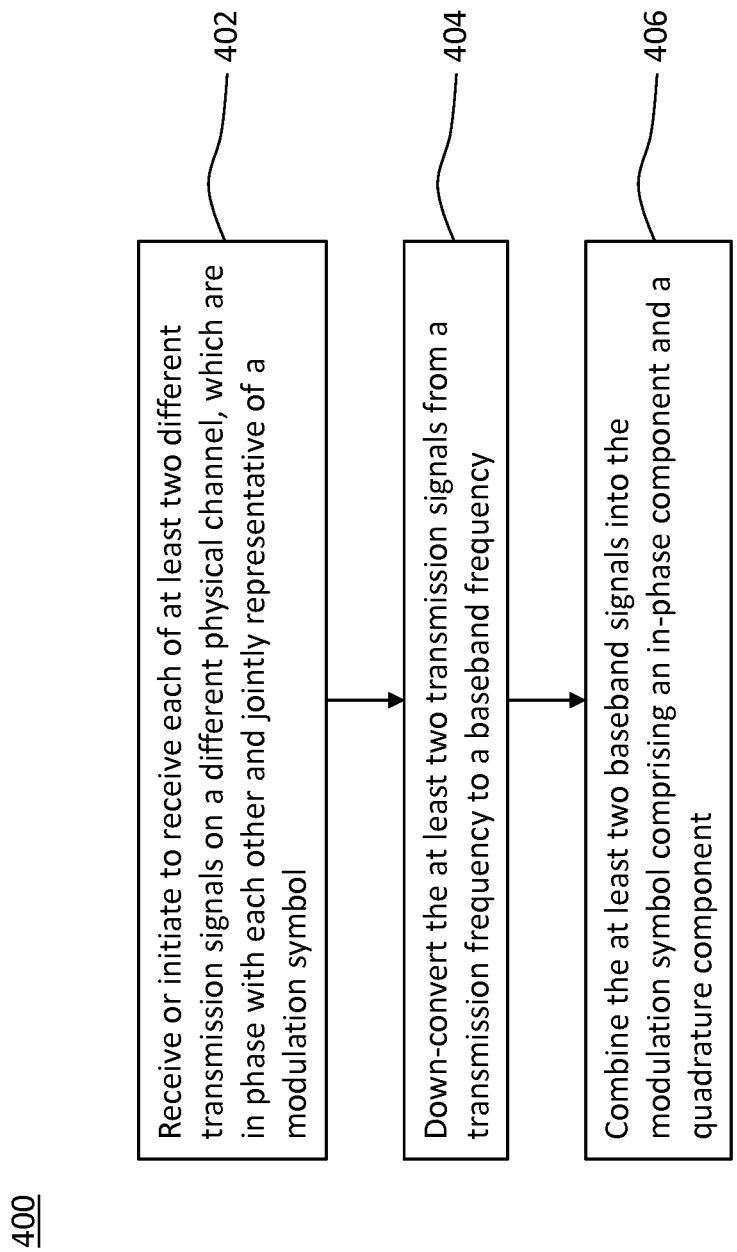
FIG. 4 shows a flowchart for a method of receiving data that is represented or representable by a modulation symbol comprising an in-phase component and a quadrature component, which method is implementable by the device of FIG. 1.

FIG. 4 shows a flowchart for a method 400 of receiving data that is represented or representable by a modulation symbol comprising an in-phase component and a quadrature component. In a step 402 of the method 400, each of at least two different transmission signals is received on a different physical channel. The transmission signals are in phase with each other and jointly representative of the modulation symbol. The at least two transmission signals are down-converted from a transmission frequency to a baseband frequency in a step 404 of the method 400. The at least two down-converted signals are combined into the modulation symbol according to a step 406 of the method 400.

Figure 5:
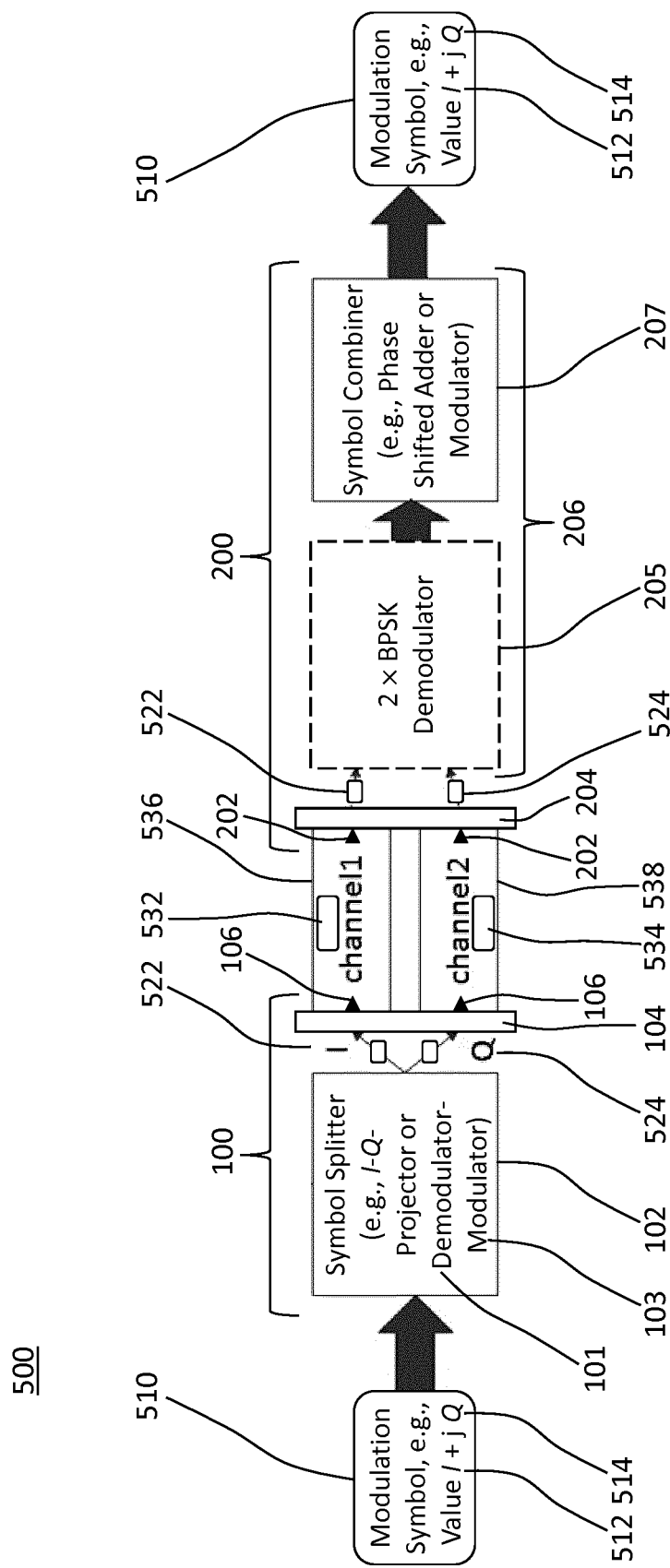
FIG. 5 shows a schematic block diagram of a first exemplary system comprising embodiments of the devices of FIGS. 1 and 2.

FIG. 5 shows a schematic block diagram of a first exemplary system 500 comprising embodiments of the devices of FIGS. 1 and 2. The modulation symbol 510 comprises an in-phase component 512, I, and a quadrature phase component 514, Q, that may be ahead of the in-phase component 512, I, by a phase shift of pi/2. In other words, the in-phase component 512, I, may correspond to a sine-component of a baseband frequency and the quadrature component 514, Q, may correspond to a cosine-component of the baseband frequency.

On a transmitting side, an embodiment of the device 100 comprises the split module 102, which may also be referred to as symbol splitter. The symbol splitter 102 may be implemented by a projector that projects each of the in-phase component 512, I, and the quadrature phase component 514, Q, of the modulation symbol 510. The projection may be performed once for each component or iteratively for multiple sections of the constellation plane, resulting in at least one in-phase component 522, I, and at least one quadrature phase component 524, Q, as the at least two baseband signals.

Alternatively or in addition, the symbol splitter 102 may be implemented by a demodulator 101 that demodulates bits being represented by the modulation symbol 510 as the data. The symbol splitter 102 may further be implemented by and a modulator 103 that generates, based on the demodulated data, at least one in-phase component 522, I, and at least one quadrature phase component 524, Q, as the at least two baseband signals.

In the case of two bits being represented by the modulation symbol 510 as the data, e.g., a 4-QAM symbol, the symbol splitter 102 may output one in-phase component 522, I, and one quadrature phase component 524, Q. The one in-phase component 522, I, and the one quadrature phase component 524, Q, may correspond to the in-phase component 512, I, and the quadrature component 514, Q, respectively. For clarity and not limitation, the case of two bits is illustrated in FIG. 5. In the case of 2·n bits being represented by the modulation symbol 510 as the data, e.g., a 2·n-QAM symbol, the symbol splitter 102 may output n in-phase components 522-1 to 522-$n$, and $n$ quadrature phase component 524-1 to 524-$n$. The sum of the n in-phase components 522-1 to 522-$n$, and the sum of the n quadrature phase components 524-1 to 524-$n$ may correspond to the in-phase component 512, I, and the quadrature component 514, Q, respectively.

The at least two baseband signals 522 and 524 are up-converted in the up-conversion module 104 to corresponding at least two transmission modules 532 and 534, respectively, for transmission on different physical channels 536 and 538, respectively.

On a receiving side, an embodiment of the device 200 receives the at least two transmission symbols 532 and 534 on the different physical channels 536 and 538, respectively. The received transmission symbols 532 and 534 are down-converted to corresponding at least two baseband signals 522 and 524 by the module 204.

The combination module 206 may also be referred to as symbol combiner. The combination module 206 may be implemented by two binary phase shift keying (BPSK) demodulators 205 or by n demodulators in the case of n bits of data in the modulation symbol 510. The combination module 206 may further comprise a d modulator 207 that generates the modulation symbol 510 based on the demodulated data. Alternatively or in combination, the combination module 206 may be implemented by (e.g., only) a phase-shifted adder as the symbol combiner. The symbol combiner 206 may generate the modulation symbol 510 out of the at least two baseband signals 522 and 524, e.g., by complex addition or vector addition of the at least two baseband signals 522 and 524.

Figure 6:
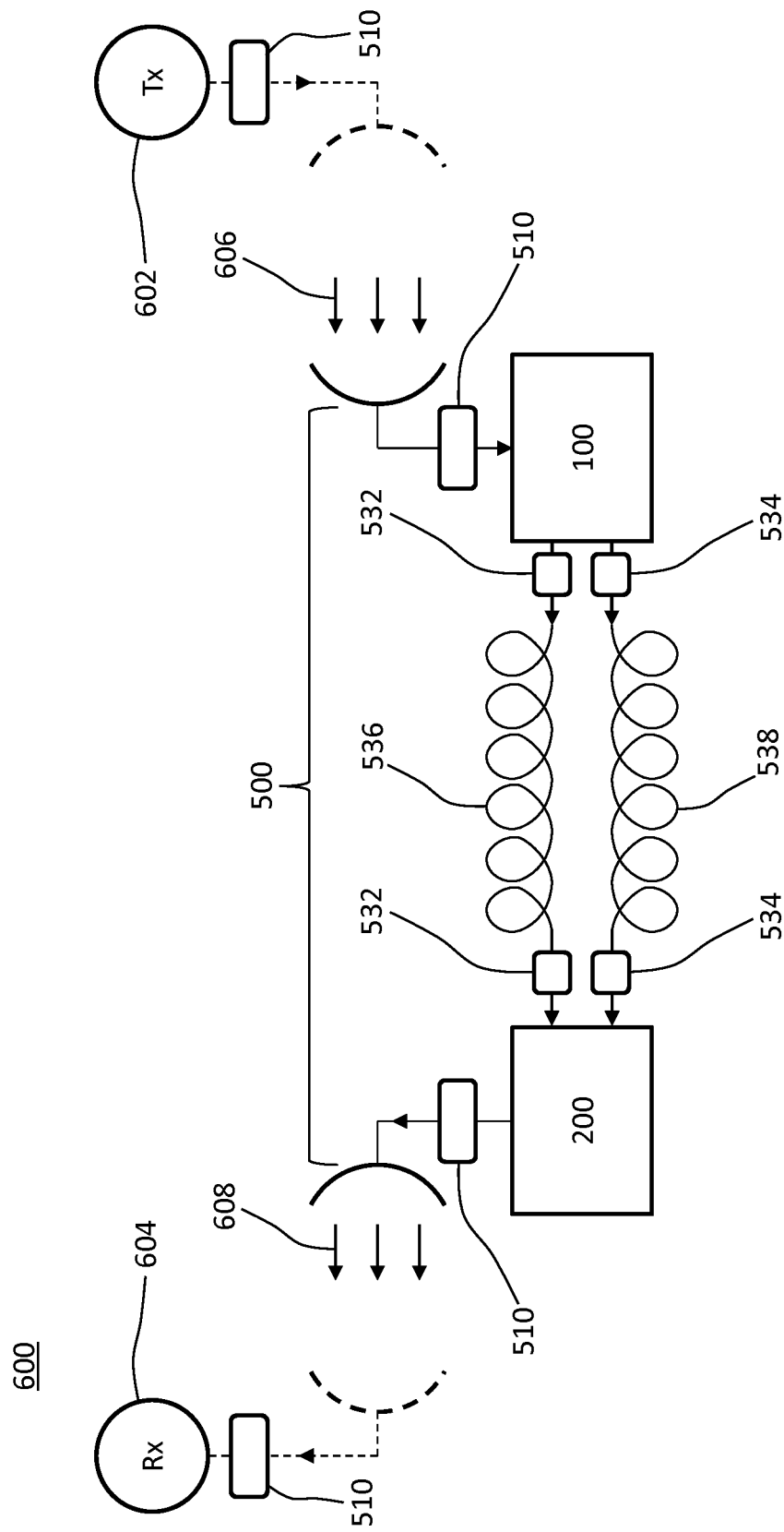
FIG. 6 shows a schematic block diagram of a second exemplary system comprising embodiments of the devices of FIGS. 1 and 2.

FIG. 6 shows a schematic block diagram of a second exemplary system 600, which may be implemented by any embodiments of the devices of FIGS. 1 and 2. The system 600 may comprise or establish a data link between a transmitter 602 and a receiver 604. The data link may comprise a microwave link 606 as a first portion of the data link. The data link may further comprise the at least two different physical channels 536 and 538 as a second portion of the data link. The second portion may be implemented by an embodiment of the first system 500. The data link may further comprise a microwave link 608 as a third portion of the data link.

The microwave link 606 may comprise a coherent channel between the transmitter 602 and the embodiment of the device 100. The modulation symbol 510 may also be referred to as coherent modulation symbol as it comprises both an in-phase component 512 and a quadrature component 514—The modulation symbol 510 is transmitted by the transmitter 602 on the coherent channel 606. The device 100 may be embodied by a media gateway that further transmits the modulation symbol 510 over the at least two different physical channel 532 and 534, e.g., implemented by optical links.

Since each of the transmission symbols 532 and 534 comprises only an in-phase component, the transmission symbols 532 and 534 may also be also referred to as incoherent modulation symbols. Analogously, since the optical link providing the at least two different physical channels 536 and 538 used for the in-phase transmission 306, the physical channels 536 and 538 or the optical links may also be referred to as an incoherent channels.

The link between the embodiment of the device 200 and the receiver 604 may comprise the microwave link 608 as the third portion of the data link. The microwave link 608 may comprise a coherent channel between the embodiment of the device 200 and the receiver transmitter 604. The modulation symbol 510 transmitted on the third portion of the link may be referred to as a coherent modulation symbol.

For the coherent portions 606 and 608 of the data link, the coherence may be achieved in time by means of a Costas loop and/or in frequency by means of reference signals used for demodulation. In contrast, on the incoherent portion, i.e., the at least two different physical channels 536 and 538, no Costas loop and/or no reference signals are used for example.

Figure 7:
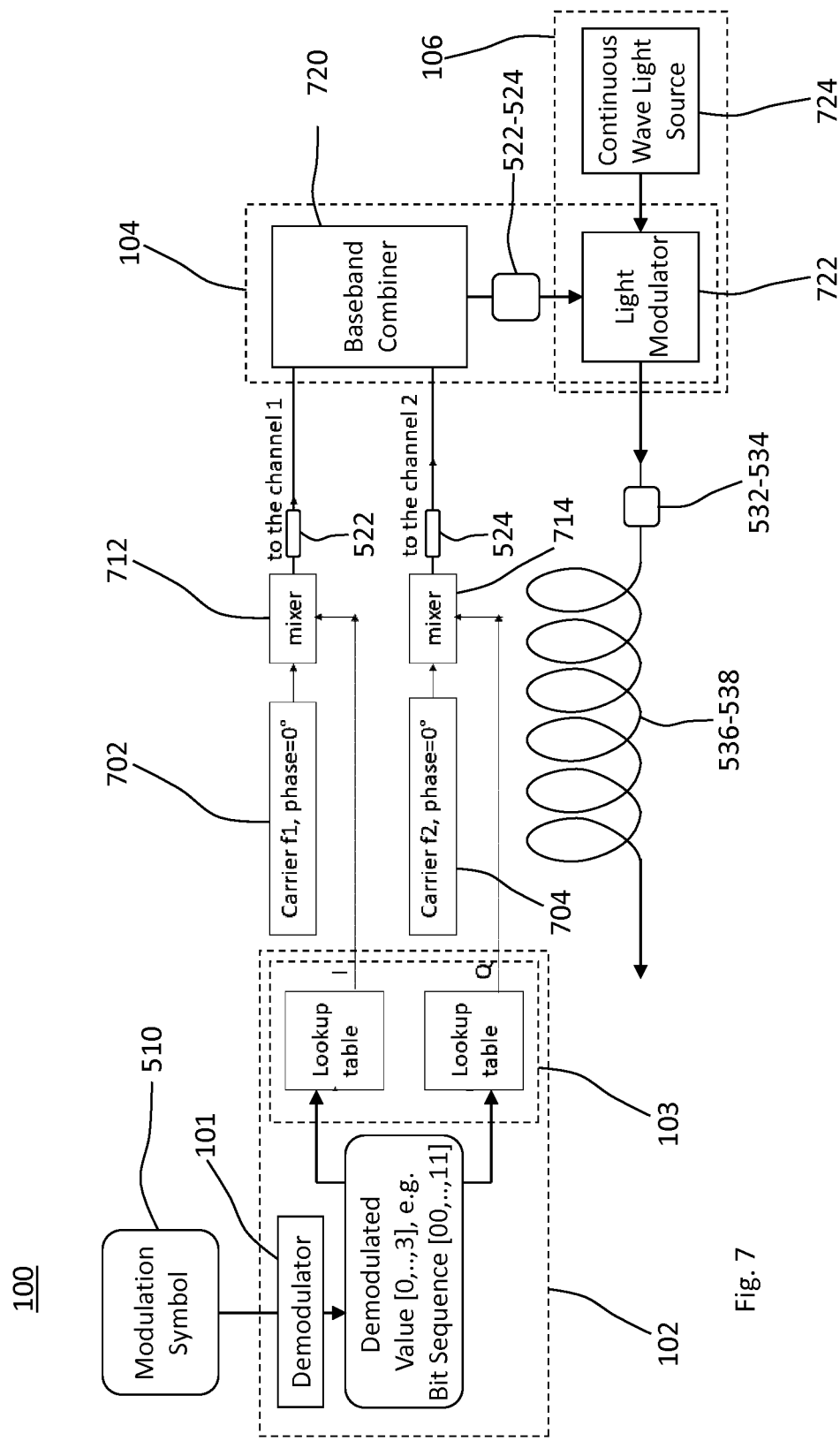
FIG. 7 shows a schematic block diagram of a first embodiment of the device of FIG. 1.

FIG. 7 shows a schematic block diagram of a first embodiment of the device 100, which may be deployed in any of the systems 500 and 600. Features equal and/or exchangeable with those of other embodiments or implementations are indicated by like reference signs.

The embodiment in FIG. 7 implements the symbol splitter 102 of the device 100 by means of a demodulator 101 that determines a value or the bits of the data being represented by the modulation symbol 510. In the case of 2·n bits being represented by the modulation symbol 510 as the data, the value may be in the range of 0 to $2^{2 \cdot n}-1$. A modulator 103, e.g., a set of 2·n tables, associates to each demodulation value one or n in-phase components 522 and one or n quadrature components 524 as the at least two baseband signals.

Each of the at least two baseband signals 522 and 524 may be mapped to a different baseband frequency by means of a local oscillator 702 and 704, respectively, and a mixer 712 and 714, respectively. The local oscillators 702 and 704, and the mixers 712 and 714 may be implemented at the symbol splitter 102 or at the up-conversion module 104.

The at least two baseband signals are combined by a baseband combiner 720 of the up-conversion module 104, i.e., the resulting signal comprises the at least two baseband signals on different carrier (or subcarrier) frequencies. The resulting signal controls a light modulator 722 that modulates (e.g., an amplitude) of a continuous (e.g., continuous-wave) light source 724 of the transmission module 106. The light modulator 722 may be implemented as part of the up-conversion module 104 and/or as part of the transmission module 106. The "up-conversion" refers to an optical frequency of the light source 724 as the transmission frequency (e.g., and not to the different carrier frequencies of the oscillators 702 and 704 used for generating the at least two baseband signals 522 and 524, respectively).

Figure 8:
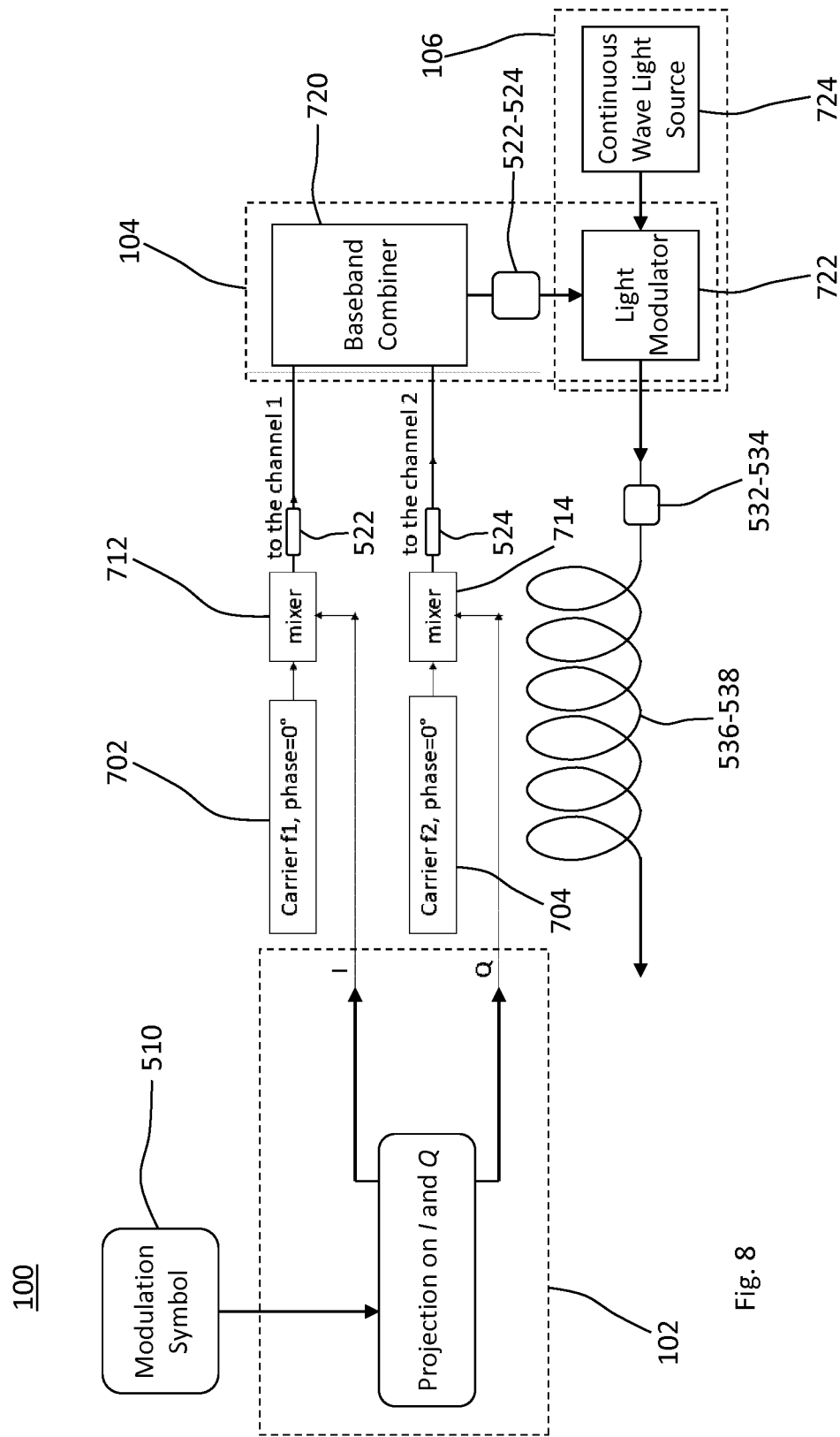
FIG. 8 shows a schematic block diagram of a second embodiment of the device of FIG. 1.

FIG. 8 shows a schematic block diagram of a second embodiment of the device 100, which may be deployed in any of the systems 500 and 600. Features equal and/or exchangeable with those of other embodiments or implementations are indicated by like reference signs.

The embodiment in FIG. 8 implements the symbol splitter 102 of the device 100 by means of a projector that determines, for each of the 2·n bits represented by the modulation symbol 510 as the data, one component for one of the 2·n baseband signals 522 and 524. That is, the projector as the symbol splitter 102 outputs one or n in-phase components 522 and one or n quadrature components 524 as the at least two baseband signals.

Figure 9:
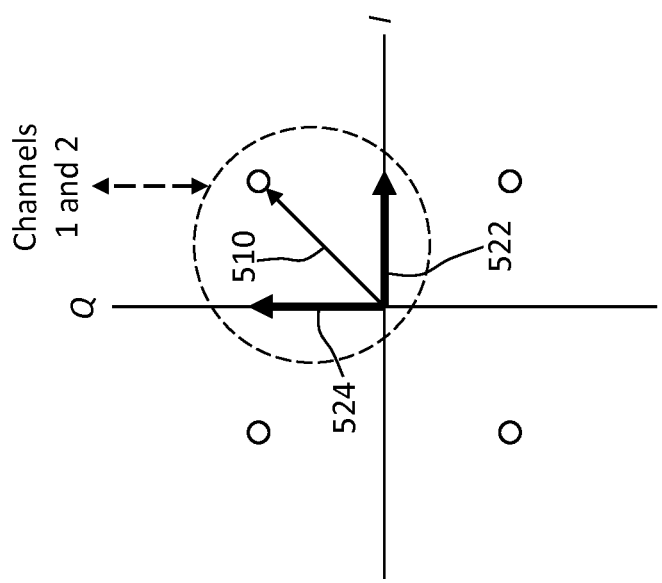
FIG. 9 schematically illustrates an exemplary constellation diagram for splitting a coherent modulation symbol into two incoherent modulation symbols.

FIG. 9 schematically illustrates an exemplary constellation diagram 900 for the splitting 302 a coherent modulation symbol 510 into two components for the corresponding two incoherent modulation symbols 522 and 524 as the two baseband signals. While the components 522 and 524 are shown as part of the constellation plane for clearly illustrating how the splitting 302 determines the two components 522 and 524, the components 522 and 524 (or more specifically, the resulting two baseband signals) are in-phase so that only the amplitude and not the phase of the respective signals is indicated at the reference signs 522 and 524.

Figure 10:
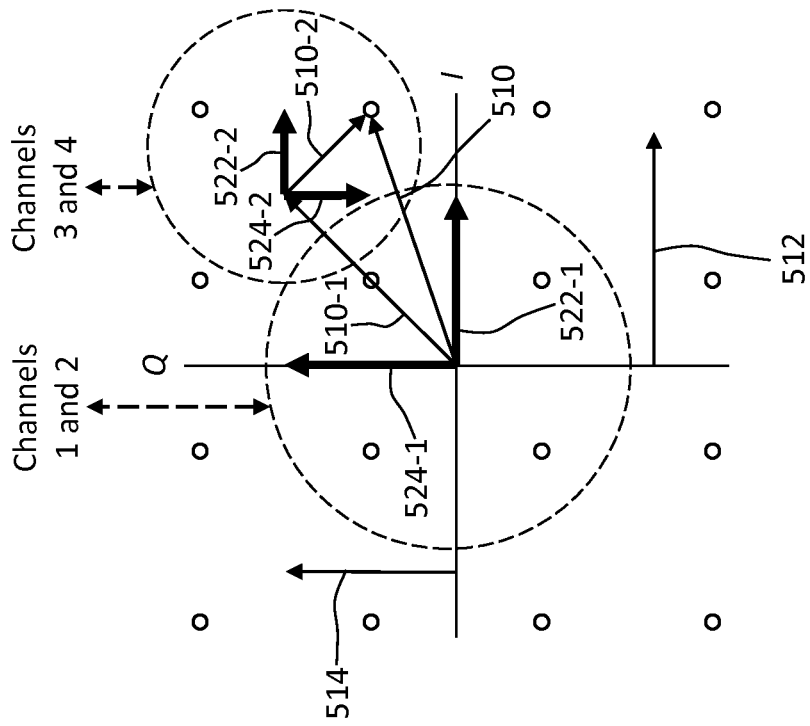
FIG. 10 schematically illustrates an exemplary constellation diagram for splitting a coherent modulation symbol into four incoherent modulation symbols.

FIG. 10 schematically illustrates an exemplary constellation diagram 900 for the splitting 302 a coherent modulation symbol 510 into four components defining the corresponding four incoherent modulation symbols 522-1, 524-1, 522-2 and 524-2 as the at least two (namely, four) baseband signals. While the components 522-1, 524-1, 522-2 and 524-2 are shown as part of the constellation plane 900 for clearly illustrating how the splitting 302 determines the four components 522-1, 524-1, 522-2 and 524-2, the resulting four baseband signals 522-1, 524-1, 522-2 and 524-2 are in-phase so that only the amplitude (and not the phase) of the respective signals is indicated at the reference signs 522-1, 524-1, 522-2 and 524-2.

For any number of 2·n bits, the I component 522-$j$ (with $j=1, \ldots, n$) may be representative of the 2·(j−1)-th bit, and the Q component 524-$j$ (with $j=1, \ldots, n$) may be representative of the 2·j-th bit.

While the exemplary splitting 302 of a 4-QAM symbol 510 in FIG. 9 may be implemented by a single projection of the in-phase and quadrature components, the splitting 302 according to FIG. 10 may be implemented by an iterative projection. The iterative projection may comprise a first projection of the 16-QAM symbol 510 on one out of 4 shifted 4-QAM constellations, and a second projection of the shift of the corresponding shifted 4-QAM constellation. In other words, the 16-QAM constellation 900 in FIG. 10 is decomposed into 4 sectors each comprising a shifted 4-QAM constellation.

Figure 11:
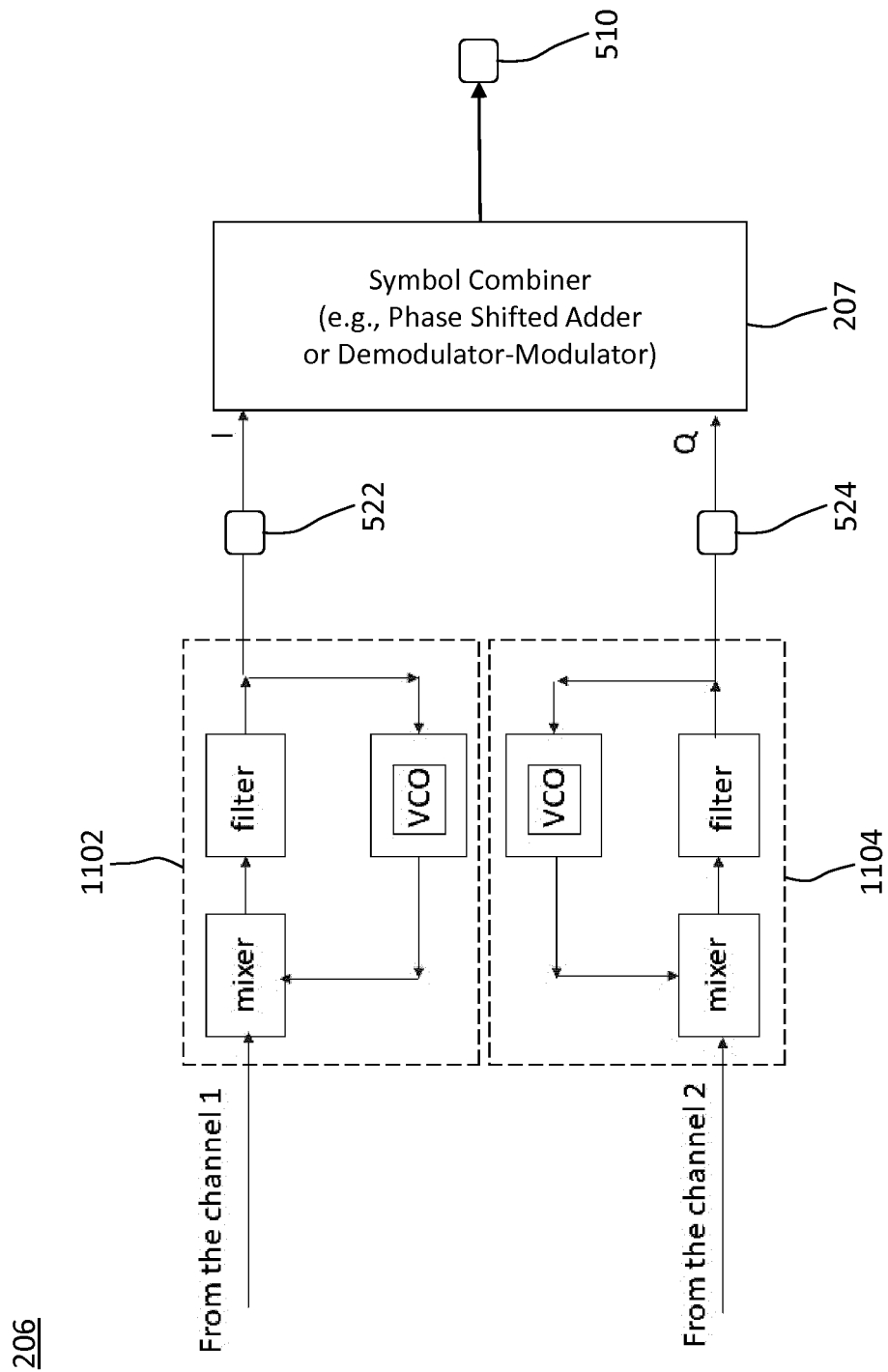
FIG. 11 shows a schematic block diagram for implementing a combining of two incoherent modulation symbols into a coherent modulation symbol.

FIG. 11 shows a schematic block diagram for implementing the combining 406 of two incoherent modulation symbols 522 and 524 as the at least two baseband signals into the coherent modulation symbol 510. Each of the incoherent modulation symbols 522 and 524 may be processed by a phase-locked loop (PLL) 1102 and 1104, respectively, that is independent of the respective other PLL 1104 and 1102. For example, the device 200 may comprise one PLL for each bit in the data. A Costas loop may be omitted.

Figure 12:
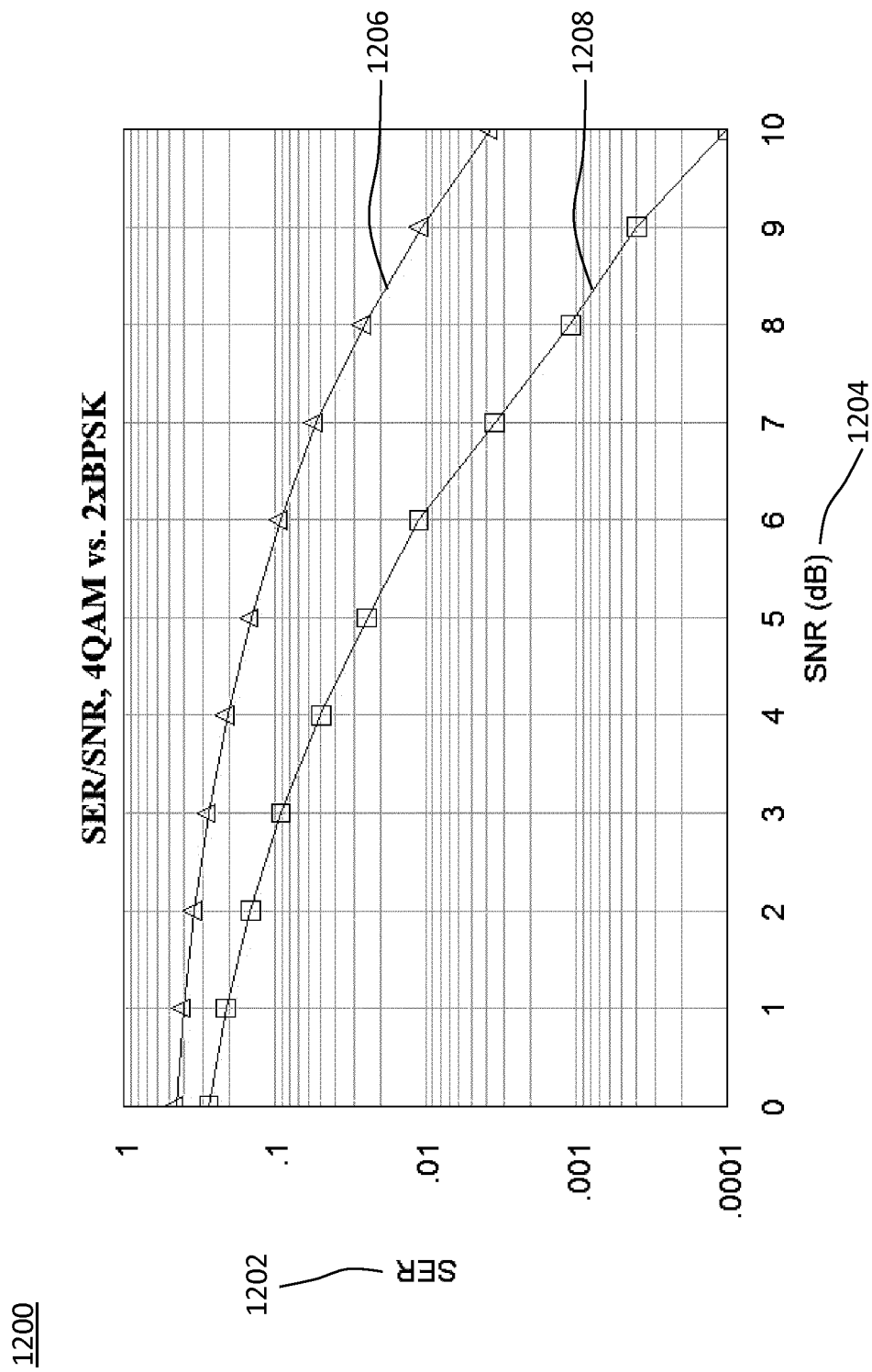
FIG. 12 shows a symbol error rate as a function of a signal-to-noise ratio for a coherent modulation symbol and corresponding two incoherent modulation symbols.

An exemplary reduction in the symbol error rate (SER) 1202 as a function of the signal-to-noise ratio (SNR) 1204 on the physical channels 532 and 534 resulting from the splitting 302 at the transmitting side and combining 406 on the receiving side is shown in the diagram 1200 of FIG. 12. The graph at reference sign 1206 corresponds to the transmission of a 4-QAM symbol 510 as a reference example (which is also referred to as coherent transmission). The graph 1208 corresponds to the transmission of the two BPSK signals 522 and 524 on the different physical channels (which is also referred to as incoherent transmission) in the same range of the SNR 1204 according to the methods 300 and 400. At 10 dBm SNR, the SER 1202 achieved by the embodiment of the technique is 40 times better as compared to a direct transmission of the modulation symbol 510.

Figure 13:
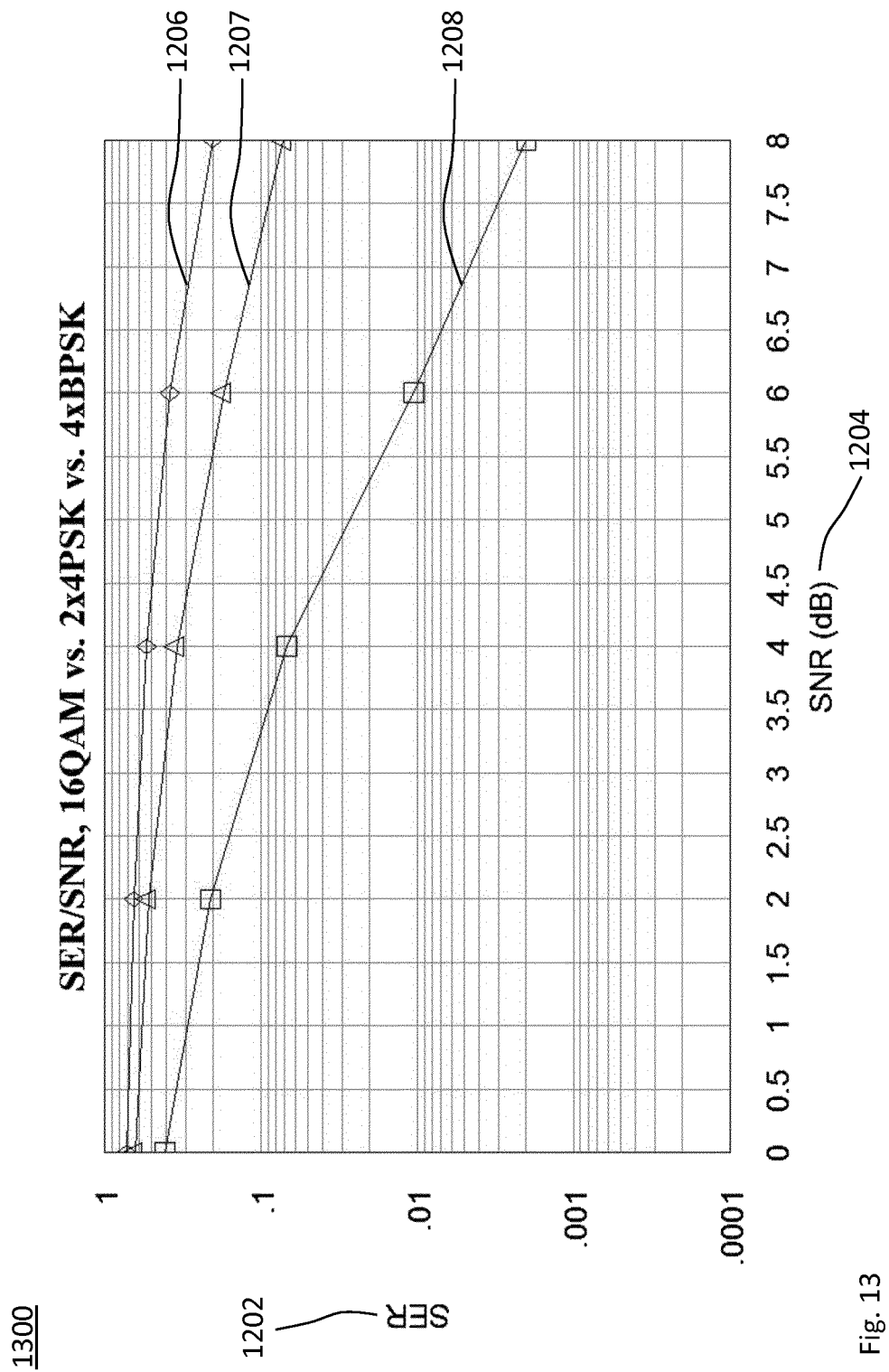
FIG. 13 shows a symbol error rate as a function of a signal-to-noise ratio for a coherent modulation symbol and corresponding four incoherent modulation symbols.

FIG. 13 shows a diagram 1300 of the SER 1202 as a function of the SNR 1204. The graph 1206 relates to the coherent 16-QAM symbol 510 when transmitted on any one of the physical channels, as a first reference example. The graph 1207 relates to a 4-PSK symbol (or a corresponding 4-QAM symbol) resulting from an exemplary implementation of the first projection of the 16-QAM symbol 510 when transmitted on any one of the physical channels, as a second reference example. The graph 1208 corresponds to the four incoherent modulation symbols 522-1, 522-2, 524-1 and 524-2 transmitted on a respective one of the physical channels according to an embodiment. The SER 1202 is reduced at 10 dB SNR by more than a factor of 20.

Figure 14:
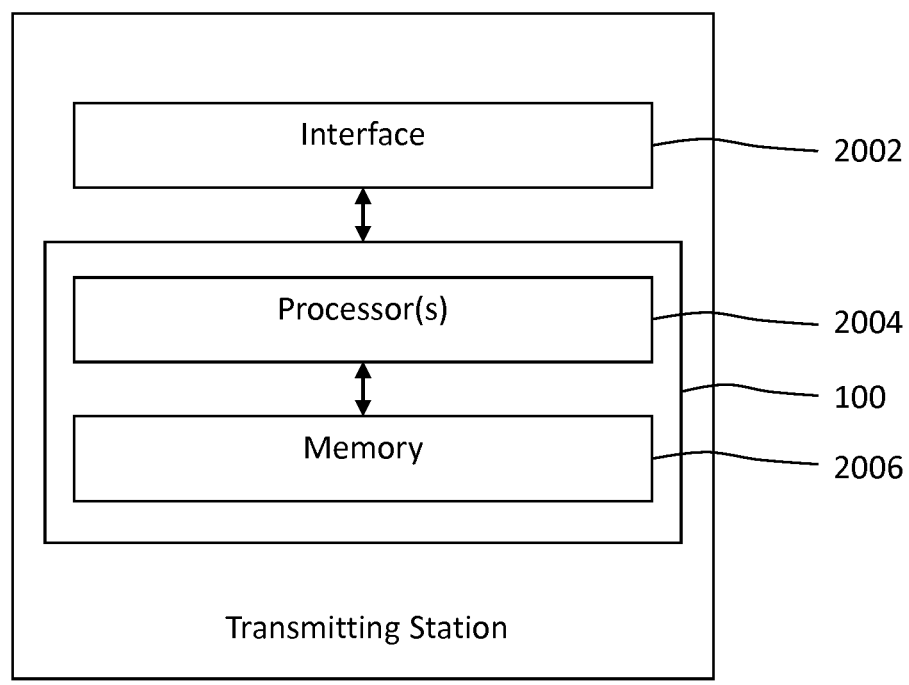
FIG. 14 shows a schematic block diagram of a third embodiment of the device of FIG. 1.

FIG. 14 shows a schematic block diagram for an embodiment of the device 100. The device 100 comprises one or more processors 2004 for performing the method 300 and memory 2006 coupled to the processors 2004. For example, the memory 2006 may be encoded with instructions that implement at least one of the modules 102, 104 and 106.

The one or more processors 2004 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 2006, data transmitter and/or base station functionality. For example, the one or more processors 2004 may execute instructions stored in the memory 2006. Such functionality may include providing various features and steps discussed herein, including any of the benefits disclosed herein. The expression "the device being operative to perform an action" may denote the device 100 being configured to perform the action.

As schematically illustrated in FIG. 14, the device 100 may be embodied by a transmitting station (e.g., a base station) 2000. The transmitting station 2000 comprises an interface 2002 coupled to the device 100 for at least one of radio communication and optical communication.

Figure 15:
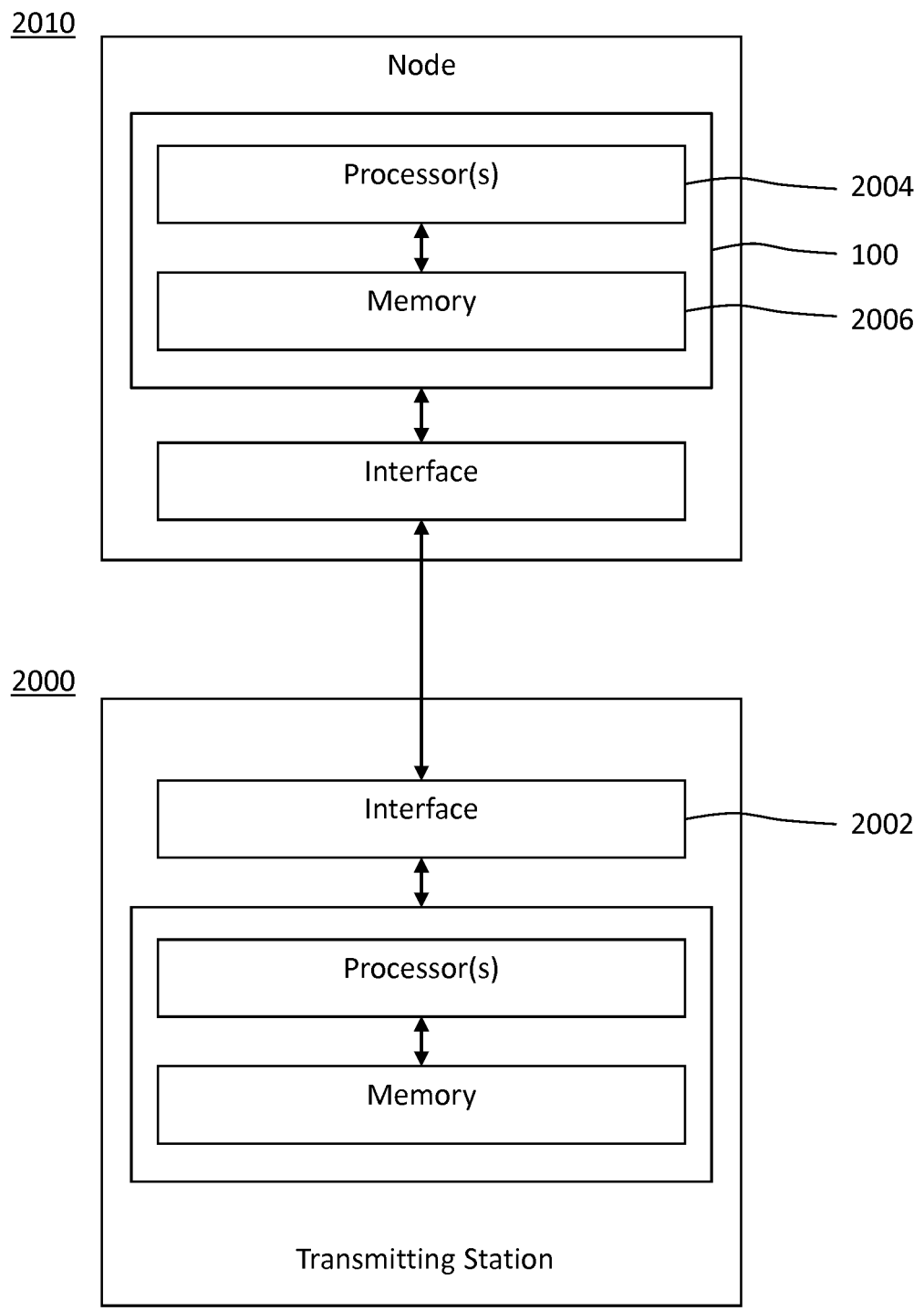
FIG. 15 shows a schematic block diagram of a fourth embodiment of the device of FIG. 1.

In a variant, e.g., as schematically illustrated in FIG. 15, the functionality of the device 100 is provided by a node 2010 (e.g., of the RAN or a core network) linked to the transmitting station 2000. That is, the node 2010 performs the method 300. The functionality of the device 100 is provided by the node 2010 to the transmitting station 2000, e.g., via the interface 2002 or a dedicated wired or wireless interface.

Figure 16:
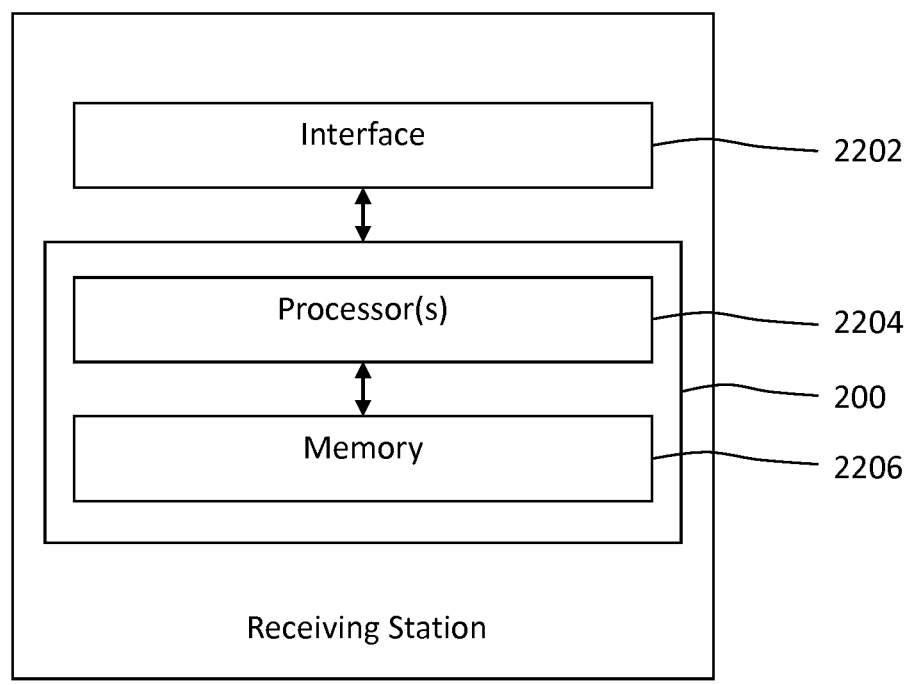
FIG. 16 shows a schematic block diagram of a first embodiment of the device of FIG. 2.

FIG. 16 shows a schematic block diagram for an embodiment of the device 200. The device 200 comprises one or more processors 2204 for performing the method 400 and memory 2206 coupled to the processors 2204. For example, the memory 2206 may be encoded with instructions that implement at least one of the modules 202, 204 and 206.

The one or more processors 2204 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as the memory 2206, data receiver and/or base station functionality. For example, the one or more processors 2204 may execute instructions stored in the memory 2206. Such functionality may include providing various features and steps discussed herein, including any of the benefits disclosed herein. The expression "the device being operative to perform an action" may denote the device 200 being configured to perform the action.

As schematically illustrated in FIG. 16, the device 200 may be embodied by a receiving station (e.g., a base station) 2200. The receiving station 2200 comprises an interface 2202 coupled to the device 200 for at least one of radio communication and optical communication.

Figure 17:
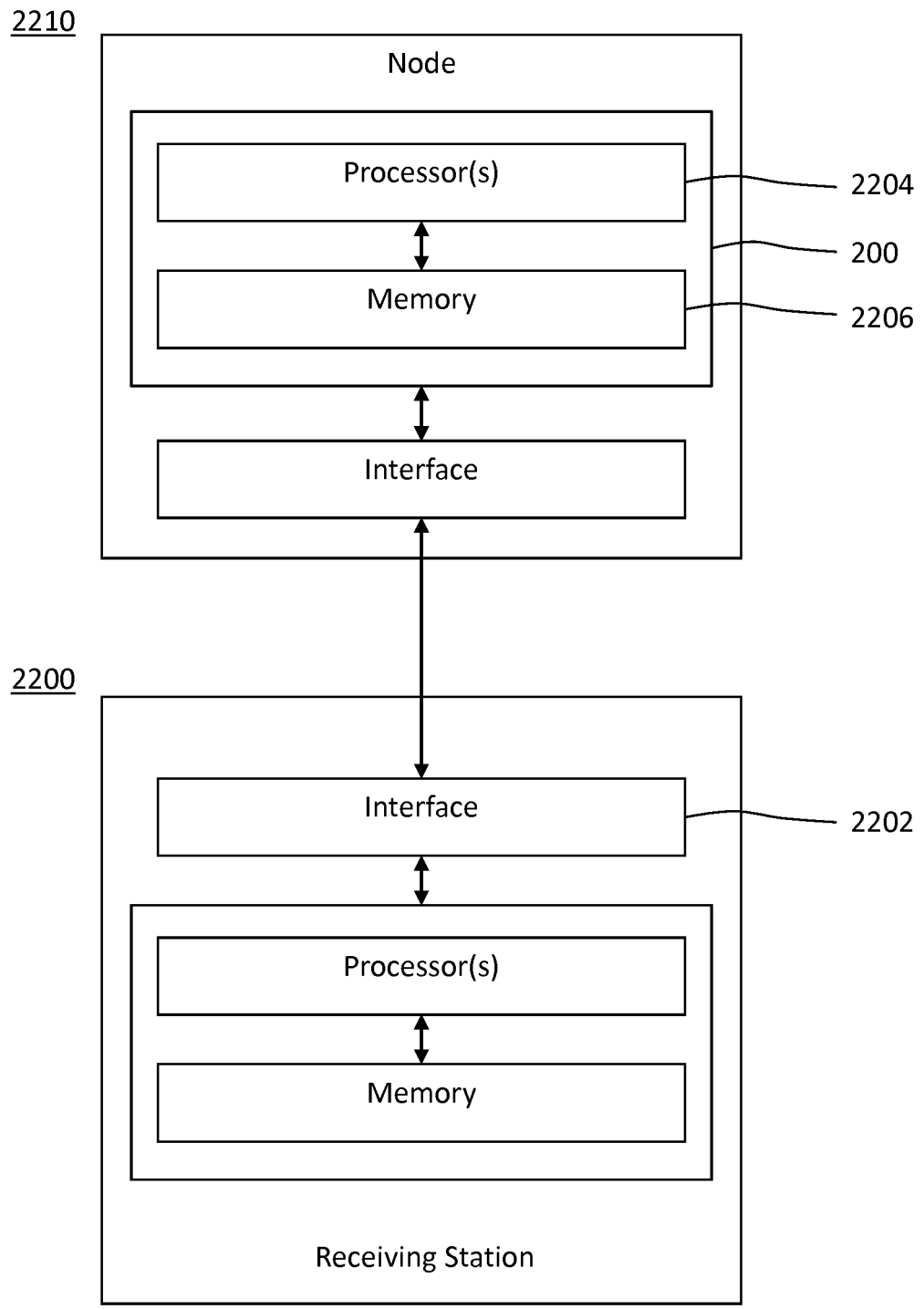
FIG. 17 shows a schematic block diagram of a second embodiment of the device of FIG. 2.

In a variant, e.g., as schematically illustrated in FIG. 17, the functionality of the device 200 is provided by a node 2210 (e.g., of the RAN or a core network) linked to the receiving station 2200. That is, the node 2210 performs the method 400. The functionality of the device 200 is provided by the node 2210 to the receiving station 2200, e.g., via the interface 2202 or a dedicated wired or wireless interface.

Any embodiment of the technique may comprise one or more of the following features. Firstly, in-phase components and quadrature components are transmitted separately, e.g., resulting in a simpler modulator and/or receiver. Secondly, the transmission signal indicative of the in-phase component and the transmission signal indicative of the quadrature component are transmitted separately, e.g., resulting in a reduction of the SNR as compared to an existing transmission of the modulation symbol. Thirdly, detection of each of the transmission signals, e.g., a detection of the transmission signal indicative of the in-phase component and a detection of the transmission signal indicative of the quadrature component, use separate PLLs (e.g., instead of a Costas loop). Fourthly, the BER may be reduced for a given SNR as compared to a conventional digital communication.

As has become apparent from above description, embodiments of the technique may (e.g., selectively) use the bandwidth available on the physical channels by splitting one complex modulation symbol in at least two binary transmission signals. Same or further embodiments can, for any constellation, construct the transmission signals at the data transmitter or reconstruct the modulation symbol at the data receiver using modulators, e.g., by means of tables.

Instead of using a modulator for both in-phase (I) and quadrature (Q) components (i.e., an IQ modulator) for the transmission signals or the underlying baseband signals, the corresponding I and Q components of the modulation symbol are transmitted in separate physical channels. In this way, more bandwidth may be used so that for the same SNR an improvement in BER is achieved. Advantageous embodiments for 4-QAM and 16-QAM symbols have been worked out.

As compared to a convention transmission using orthogonal polarization, the BER may be further improved, e.g., because noise contributions for the one or more in-phase component and the one or more quadrature components on the different physical channels are fully independent in at least some embodiments.

The technique may allow propagating or tunneling a modulation symbol, that is received on a coherent channel, over an incoherent channel. One aspect of the technique may be embodied by a gateway between a coherent channel (e.g., providing the modulation symbol) and incoherent channels (e.g., as the physical channels). Another aspect of the technique may be embodied by a gateway between incoherent channels as the physical channels (e.g., as input to the gateway) and a coherent channel (e.g., as output of the gateway). An example for a modulation symbol over the coherent channel includes any QAM symbol over a microwave link. An example for a modulation symbol as the transmission signal over an incoherent channel includes a BPSK symbol or an On-Off-Keying (OOK) signal over an optical link. For a given data rate, a bandwidth of the BPSK signal and a bandwidth of the OOK signal may be equal.

The technique may allow seamlessly bridging a gap in a coherent channel (e.g., in a microwave link) by an incoherent channel (e.g., an optical link). The technique may be deployed for a data link structured as follows: Symbol Transmitter—Coherent Channel (e.g., Microwave Link)—Gateway according to one aspect of the technique—Incoherent Channel (e.g., Optical Link)—Gateway according to another aspect of the technique—Coherent Channel (e.g., Microwave Link)—Symbol Receiver. The incoherent channels for bridging the gap in above link structure may be transparent (e.g., on the physical layer) for both the symbol transmitter and the symbol receiver.

Embodiments can significantly reduce the BER for any SNR values. Furthermore, a detection of the transmission signals is simpler. For example, a Costas loop may be replaced by one or more PLLs. More specifically, the Costas loop may be replaced by a PLL driving one mixer per bit.

The technique may be implemented using one laser and photo diode only as communication interfaces. Depending on a data rate of the data communication, one optical and two microwave carriers may be sufficient.

The technique may utilizes more physical bandwidth on the physical channels to improve the BER, which increases the likelihood that useful data is transmitted and decreases the likelihood of corrections for higher layer protocols.

The technique may be implemented to reduce or prevent retransmissions due to error correction, which may further improve stability of latency. The technique may be beneficially deployed for data communication requiring high reliability and/or under low bandwidth.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method, for a data transmitter, of transmitting data that can be represented by a modulation symbol comprising in-phase and quadrature components, wherein the method comprises:
receiving, from the data receiver, a report that indicates a channel quality associated with a physical channel between the data transmitter and the data receiver; and
selectively performing the following operations based on the indicated channel quality:
splitting the modulation symbol into at least two baseband signals that are in phase with each other and that are jointly representative of the modulation symbol,
up-converting the at least two baseband signals from a baseband frequency to a transmission frequency, and
transmitting the at least two up-converted signals on respective at least two physical channels.

2. The method of claim 1, wherein one or more of the following applies:
the at least two up-converted signals are up-converted in phase with each other; and
the at least two up-converted signals are transmitted in phase with each other.

3. The method of claim 1, wherein:
one or more of the at least two baseband signals are representative of the in-phase component of the modulation symbol; and
one or more of the at least two baseband signals are representative of the quadrature component of the modulation symbol.

4. The method of claim 3, wherein the splitting the modulation symbol comprises:
projecting each of the in-phase component and the quadrature component into sub-components; and
generating the at least two baseband signals from the respective sub-components.

5. The method of claim 3, wherein the splitting the modulation symbol comprises:
demodulating the modulation symbol into the data; and
modulating the data into the at least two different baseband signals.

6. The method of claim 1, wherein splitting the modulation symbol comprises modulating each of the baseband signals by binary phase shift keying.

7. The method of claim 1, wherein the at least two physical channels comprise at least one optical link.

8. The method of claim 1, wherein:
the data comprises 2·n bits, wherein n is an integer number; and
splitting the modulation symbol comprises:
splitting the modulation symbol is split into n in-phase components and n quadrature components, and
generating 2·n baseband signals, from the respective n in-phase components and n quadrature components, for up-conversion and transmission on a respective 2·n physical channels.

9. The method of claim 1, wherein the modulation symbol is a quadrature amplitude modulation (QAM) symbol.

10. A method, for a data receiver, of receiving data that can be represented by a modulation symbol comprising in-phase and quadrature components, wherein the method comprises:
transmitting, to a data transmitter, a report that indicates a channel quality associated with a physical channel between the data transmitter and the data receiver; and
selectively performing the following operations based on the indicated channel quality:
receiving, from the data transmitter on a transmission frequency, at least two signals on respective at least two physical channels, wherein the at least two signals are jointly representative of the modulation symbol;
down-converting the at least two signals from the transmission frequency to respective at least two baseband signals at a baseband frequency, wherein the at least two baseband signals are in phase with each other and are jointly representative of the modulation symbol; and
combining the at least two baseband signals into the modulation symbol.

11. The method of claim 10, wherein one or more of the following applies:
the at least two signals are received in phase with each other; and
the at least two signals are down-converted in phase with each other.

12. The method of claim 10, wherein:
one or more of the at least two down-converted signals are representative of the in-phase component of the modulation symbol; and
one or more of the at least two down-converted signals are representative of the quadrature component of the modulation symbol.

13. The method of claim 10, wherein each of the down-converted signals is modulated by binary phase shift keying.

14. The method of claim 10, wherein the at least two physical channels comprise at least one optical link.

15. The method of claim 10, wherein combining the at least two baseband signals comprises:
phase-shifting at least one of the baseband signals to form the quadrature component; and
obtaining the in-phase component from a different at least one of the baseband signals without phase shifting.

16. The method of claim 10, wherein combining the at least two baseband signals comprises:
demodulating the at least two baseband signals into the data; and
modulating the demodulating data to form the baseband symbol comprising the in-phase and quadrature components.

17. The method of claim 10, wherein:
the data comprises 2·n bits, wherein n is an integer number; and
2·n signals, corresponding to the respective 2·n bits, are received via respective 2·n physical channels and down-converted to respective 2·n baseband signals;
combining the at least two baseband signals comprises:
forming the in-phase component from n of the 2·n baseband signals; and
forming the quadrature component from a different n of the 2·n baseband signals.

18. The method of claim 10, wherein the modulation symbol is a quadrature amplitude modulation (QAM) symbol.

19. A data transmitter device arranged for transmitting data that can be represented by a modulation symbol comprising in-phase and quadrature components, wherein the data transmitter device comprises:
at least one processor; and
a memory storing instructions executable by the at least one processor, whereby the data transmitter device is operative to:
receive, from the data receiver, a report that indicates a channel quality associated with a physical channel between the data transmitter device and the data receiver;
selectively perform the following operations based on the indicated channel quality:
split the modulation symbol into at least two baseband signals that are in phase with each other and that are jointly representative of the modulation symbol,
up-convert the at least two baseband signals from a baseband frequency to a transmission frequency, and
transmit the at least two up-converted signals on respective at least two physical channels.

20. A data receiver device arranged for receiving data that can be represented by a modulation symbol comprising in-phase and quadrature components, wherein the data receiver device comprises:
at least one processor; and
a memory storing instructions executable by the at least one processor, whereby the data receiver device is operative to:
transmit, to the data transmitter, a report that indicates a channel quality associated with a physical channel between the data transmitter and the data receiver device; and
selectively perform the following operations based on the indicated channel quality:
receive, from the data transmitter on a transmission frequency, at least two signals on respective at least two physical channels, wherein the at least two signals are jointly representative of the modulation symbol;
down-convert the at least two signals from the transmission frequency to respective at least two baseband signals at a baseband frequency, wherein the at least two baseband signals are in phase with each other and are jointly representative of the modulation symbol; and
combine the at least two baseband signals into the modulation symbol.

\* \* \* \* \*